United States Patent
Boone et al.

[11] 3,791,689
[45] Feb. 12, 1974

[54] CONTACT LENS HOLDER

[76] Inventors: Roger S. Boone, 721 Fincastle, Tazewell; Frank Pyott, 601 Fairground Rd., Falls Church, both of Va.

[22] Filed: June 11, 1971

[21] Appl. No.: 152,292

[52] U.S. Cl. ............................ 294/1 CA, 294/64 R
[51] Int. Cl. ............................................... A61f 9/00
[58] Field of Search .......... 294/1 CA, 64 R; 351/16

[56] References Cited
UNITED STATES PATENTS

| 3,600,028 | 8/1971 | Henning | 294/1 CA |
| 3,583,795 | 6/1971 | Heine | 351/16 |
| 2,384,334 | 9/1945 | Olson | 294/1 CA |
| 3,091,328 | 5/1963 | Leonardos | 294/1 CA |
| 3,129,971 | 4/1964 | Kobler | 294/1 CA X |
| 3,304,113 | 2/1967 | Hutchison | 294/1 CA X |

Primary Examiner—Evon C. Blunk
Assistant Examiner—Bruce H. Stoner, Jr.
Attorney, Agent, or Firm—Joseph Geiger

[57] ABSTRACT

A device designed for holding and aligning corneal lenses during insertion and removal from the eye, where the lens can be held against a lens cup under partial vacuum created by a squeeze bulb, while a fiber-optical light conductor terminating inside the lens cup transmits a pencil of light for convenient alignment with the eye, the latter having an angled-off light receiving axis to eliminate undesirable background interference from the light source.

5 Claims, 3 Drawing Figures

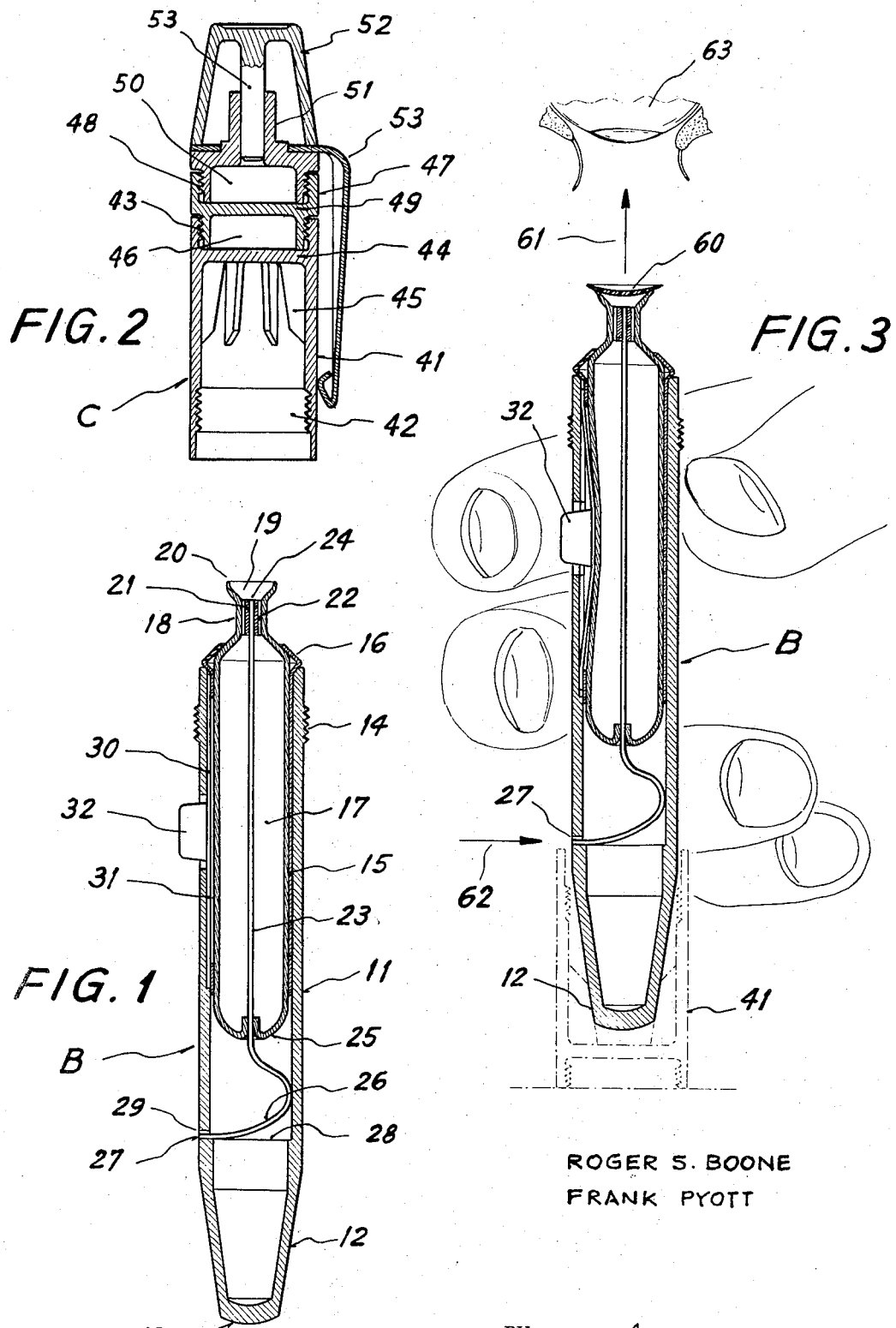

CONTACT LENS HOLDER

BACKGROUND OF THE INVENTION

1. Field of the Invention

The invention relates to vacuum-assisted holding and positioning devices, and in particular to a device for holding and aligning corneal lenses during insertion and removal from the human eye.

2. Description of the Prior Art

THe use of corneal lenses (contact lenses) has become widely accepted, either as an alternative to spectacles or to correct ophthalmic deficiencies for which spectacles are inadequate. This widespread use of contact lenses has prompted a number of inventors to suggest devices and instruments designed to overcome the sometimes frustrating problems accompanying the manipulation of these tiny, delicate lenses into and out of contact with the cornea of the eyeball.

Several of these known devices include vacuum means to retain the lens against one extremity of the device, including various ways of first establishing a partial vacuum and of later releasing the lens. Other devices include optical alignment aides, either in the form of a target made visible through the lens or in the form of light ray directed through the lens from a built-in battery-powered light source.

Among the shortcomings characteristic of these known devices are their weight and their need of maintenance, especially in the case of battery-powered devices; further the lack of carrying convenience and, in many cases, the cost of manufacture. Devices using a central aperture as a light path for optical alignment have the additional disadvantage of having to be aimed at a light source, the light source then becoming an interfering bright background for the eye.

SUMMARY OF THE INVENTION

The invention proposes a device designed to overcome the above-mentioned prior-art shortcomings, while offering novel features and advantages of which the most important are:

a pushbutton-operated vacuum device for safe holding and positive release of the lens from the holding cup;

a well-defined optical alignment axis derived from a random outside light source which is not at the same time an interfering background light;

a barrel-and-cap construction in the shape of a fountain pen permitting convenient carrying in a coat pocket or in a purse;

possible use of the cap as a stand for persons whose fingers are unsteady; and lens storage compartments inside the barrel cap.

These features are combined in a preferred embodiment of the invention, where the lens cup and squeeze bulb for the vacuum-retention of the corneal lens are of one piece, the squeeze bulb being surrounded by a rigid barrel and operable by a pushbutton and squeeze blade. A centrally arranged light conductor of optical fiber extends from the bottom of the lens cup through the squeeze bulb and continues, via a bent portion, radially through the barrel wall to the outside thereof.

BRIEF DESCRIPTION OF THE DRAWING

In the accompanying drawing is illustrated, by way of an example, an embodiment of the invention, represented in the various figures as follows:

FIG. 1 shows a contact lens holder in the form of a fountain pen barrel as part of an embodiment of the invention;

FIG. 2 shows a matching cap for the contact lens holder of FIG. 1 serving also as a lens receptacle and stand; and FIG. 3 shows the contact lens holder of FIG. 1 being operated to insert a lens.

DESCRIPTION OF THE PREFERRED EMBODIMENT

The preferred embodiment of the invention consists of two main parts, a barrel assembly B shown in FIG. 1, and a cap assembly C shown in FIG. 2. Together they form a fountain pen-shaped device which can be conveniently carried in a coat pocket or in a purse.

The barrel assembly B of FIG. 1 consists of an elongated cylindrical barrel 11 whose lower portion has the form of a taper 12 terminating with a closed end 13. Near its upper end the barrel has a male thread 14. Tightly fitting the bore of the barrel is a rigid sleeve 15 which is longitudinally positioned by a collar 16, while in turn surrounding and positioning a cylindrical squeeze bulb 17. The latter is of resiliently deformable material, such as rubber, for example.

The upper portion of the bulb includes a neck 18 of reduced diameter which carries a lens cup 19 which terminates in a flexible sealing lip 20 in the form of a cirCular rim. Inside the neck 18 is positioned a plug 21 which, while forming a bottom for the lens cup 19, includes air passages 22 connecting the interior of the cylindrical part of the squeeze bulb 17 with the lens cup.

The plug 21 also holds in its center the light-transmitting end 24 of a thin light conductor 23 of optical fiber, the fiber conductor extending along the axis of the barrel assembly, through the closed bottom end 25 of the squeeze bulb. Beyond this point, the light conductor is curved in the form of a hook portion 26, the light-receiving end 27 of the optical fiber conductor traversing the barrel wall to the outside in a radial direction.

The purpose of the hook portion 26 is to maintain the light receiving end 27 in position, while permitting limited slight displacements of the squeeze bulb 17 under operation. It also facilitates the assembly operation by guiding the conductor end 27 along the inside wall of the barrel until it abuts against the interior shoulder 28 guiding the end 27 through an adjacent small bore 29 in the barrel wall.

The barrel 11 further includes in its bore, a longitudinal groove 30 whose radial orientation is approximately parallel to that of the bore 29. A spring-action squeeze blade 31 inside this groove is retained by the sleeve 15, the latter having a rectangular opening wider, but shorter than the blade 31, to permit a controlled deflection of the blade toward the squeeze bulb 17. This deflection is produced by depressing the rectangular push button 32 which protrudes through a corresponding opening in the barrel wall.

The cap assembly C of FIG. 2 consists of a cap base 41 designed to fit over the upper portion of the barrel assembly B, with a female thread 42 matching the barrel thread 14. On the inside of the base 41 are provided several radially spaced ribs 45 matching the barrel taper 12 to permit frictional engagement therewith.

The upper end portion of the base 41 includes another female thread 43 and a partition wall 44 which, when viewed upside down, form a sealing cap for a first lens compartment 46. A compartment cap 47 fits inside the upper end of the base 41 to complete the compartment 46, the upper half of the compartment cap 47 being identical to the upper end portion of the base 41, including a third female thread 48 and partition wall 49, thereby similarly serving as a sealing cap for a second lens compartment 50.

Completing the second lens compartment 50 is a head section 51 fitting inside the upper end of the compartment cap 47. The upper extremity of the cap assembly is formed by a hollow end plug 52 which, via a central pin 53, engages a matching bore in the head section. This engagement may be secured by either a press fit or an adhesive bond.

Between the head section 51 and the end plug 52 may be retained a clip 53 in the manner of a foundation pen clip. It should be evident from FIG. 2 that, on the one hand, additional compartment caps similar or identical to compartment cap 47 may be added to the cap assembly C, or that, on the other hand, the compartment cap 47 may be omitted from the assembly.

In operation, as shown in FIG. 3, the barrel assembly B is capable of creating a partial vacuum in the squeeze bulb 17 and lens cup 19, when, upon depression of the push button 32, a corneal lens 60 is placed on the lens cup 19 and the button 32 is released. Release of the lens 60 from the lens cup is obtained by again depressing the button 32 until the partial vacuum is eliminated; FIG. 3 shows a convenient finger position.

A thin light beam, represented by arrows 61 and 62 greatly facilitates the delicate movement coordination necessary to safely bring the lens holder to the eye 63 without missing the cornea or impacting it. For this purpose, the light-receiving end 27 of the device may be aimed at any convenient outside light source. This light source then cannot create any undesirable background lighting for the eye 63, because the latter looks in a different direction.

For a person whose hand is too unsteady for freely manipulating the device, it may be advisable to rest the barrel assembly on a vertical support, while bending the head to approach the eye to the lens. This is made possible by slipping the cap base 41 over the tapered bottom end 12 of the barrel, as indicated in phantom outline in FIG. 3. In this vertical position, the device may also be used for lens insertion without operation of the vacuum device.

It should be understood, of course, that the foregoing disclosure relates to only a preferred embodiment of the invention and that it is intended to cover all changes and modifications of the example herein chosen for the purposes of disclosure which do not constitute departures from the spirit and scope of the invention as set forth in the appended claims.

We claim:

1. A device for holding and aligning corneal lenses during insertion and removal from the eye and comprising in combination:

an elongated barrel serving as a housing for the device, the barrel having a longitudinal vertical axis and an open upper end;

a squeeze bulb of resiliently compressible material arranged inside the barrel so as to protrude from the upper end thereof, the squeeze bulb having an axial opening in its upper end, its midportion being depressible from the outside of the barrel through a lateral opening in the barrel wall;

a lens cup at the upper end of the squeeze bulb which is closable by a lens placed upon it from above, the axial opening of the squeeze bulb leading into the bottom of the lens cup; and an optical fiber conductor extending sealingly through the squeeze bulb and through an opening in the barrel wall to the outside of the latter, the light-receiving end of the optical fiber conductor being located in said barrel wall opening, and the light-emitting end of the optical fiber conductor being located in the vicinity of the axial opening of the squeeze bulb in alignment with the center of the lens cup.

2. A device as defined in claim 1, wherein:

the barrel has a closed bottom end, the barrel cavity including a cavity portion below the bottom end of the squeeze bulb; and the optical fiber conductor extends axially through the entire length of the squeeze bulb and further, over a curved conductor portion located in said barrel cavity portion, through the side wall of the barrel, the opening in the barrel wall and the light-receiving end of the optical conductor being oriented substantially radially in relation to the barrel axis.

3. A device as defined in claim 1, wherein:

the squeeze bulb includes a knob-like protrusion which reaches through the lateral opening in the barrel wall and which can be depressed by a finger to operate the squeeze bulb.

4. A device as defined in claim 1, further comprising:

a cap which is engageable with the upper end portion of the barrel to close the latter so as to protect the lens cup, the cap being alternatively engageable with the lower end portion of the barrel to serve as a temporary supporting base for the device.

5. A device as defined in claim 4, wherein:

the cap includes at least one sealable compartment for the storage of corneal lenses.

* * * * *